(12) United States Patent
Mok et al.

(10) Patent No.: US 8,090,732 B2
(45) Date of Patent: Jan. 3, 2012

(54) COLLABORATIVE SEARCHING

(75) Inventors: Swee M. Mok, Palatine, IL (US);
William P. Alberth, Prairie Grove, IL (US); John R. Barr, Deer Park, IL (US); Jonathan R. Engelsma, Hudsonville, MI (US); Steven F. Gillig, Roselle, IL (US); Xiang Xu, Nanjing (CN)

(73) Assignee: Motorola Mobility, Inc., Libertyville, IL (US)

( * ) Notice: Subject to any disclaimer, the term of this patent is extended or adjusted under 35 U.S.C. 154(b) by 399 days.

(21) Appl. No.: 12/335,885

(22) Filed: Dec. 16, 2008

(65) Prior Publication Data
US 2010/0153413 A1 Jun. 17, 2010

(51) Int. Cl.
*G06F 7/00* (2006.01)
*G06F 17/30* (2006.01)
(52) U.S. Cl. .......................... 707/758; 707/713
(58) Field of Classification Search .................. None
See application file for complete search history.

(56) References Cited

U.S. PATENT DOCUMENTS

| | | | |
|---|---|---|---|
| 6,732,088 B1 * | 5/2004 | Glance | 1/1 |
| 6,745,178 B1 * | 6/2004 | Emens et al. | 707/741 |
| 2004/0162830 A1 | 8/2004 | Shirwadkar et al. | |
| 2006/0010117 A1 * | 1/2006 | Bonabeau et al. | 707/3 |
| 2007/0061218 A1 | 3/2007 | Palestrant et al. | |
| 2007/0226183 A1 * | 9/2007 | Hart et al. | 707/3 |
| 2008/0033930 A1 * | 2/2008 | Warren | 707/5 |
| 2008/0077558 A1 * | 3/2008 | Lawrence et al. | 707/3 |

FOREIGN PATENT DOCUMENTS

| | | |
|---|---|---|
| EP | 1 647 903 A1 | 4/2006 |
| JP | 11-219370 A | 8/1999 |
| JP | 2005-071002 A | 3/2005 |
| WO | 2005-066838 A1 | 7/2005 |

OTHER PUBLICATIONS

Tae-Geun Kim, "Corresponding Application PCT/US2009/067822—PCT International Search Report and Written Opinion," WIPO, ISA/KR, Korean Intellectual Property Office, Daejeon, Republic of Korea, Jul. 2, 2010, 8 pages, most relevant pp. 4-5, 8.

* cited by examiner

*Primary Examiner* — Kuen Lu
*Assistant Examiner* — Tuan A Pham

(57) ABSTRACT

Each user can contribute to an original search and to refining the results of the search. Preferences of all of the users are considered in the search even while those preferences can be kept private. In some embodiments of the present invention, at least two users each submit a search query. The multiple search queries are logically combined to produce one set of search results. The results can be reviewed by the users and refined if necessary. In some embodiments, a search query can be specified by a single user, but the search engine takes into consideration the stored preferences of multiple users (in addition to the search query itself, of course).

23 Claims, 4 Drawing Sheets

COLLABORATIVE SEARCHING

FIELD OF THE INVENTION

The present invention is related generally to computer-mediated search tools and, more particularly, to allowing multiple inputs to define a search.

BACKGROUND OF THE INVENTION

In a typical search scenario, a user types in a search string. The string is submitted to a search engine which analyzes the string and then returns its search results to the user. The user may then choose among the returned results. However, often the results are not to the user's liking, so he chooses to refine the search. (Here, "refine" means to narrow or to broaden or to otherwise change the scope of the search or the ordering of the results.) To do this, the user edits the original search string, possibly adding, deleting, or changing terms. The altered search string is submitted to the search engine (which typically does not remember the original search string), which begins the process all over again.

This straightforward process breaks down when the search is being performed as part of a group decision-making process. In this situation, usually one person runs the search while the others haphazardly offer their own, often conflicting, advice on how to refine the search. Most people have some experience in group decision making, wherein individual group members, each with a different set of constraints and personal preferences, try to work together to make a unified decision that affects everyone in the group. Whether the outcome is of the highest importance or is trivial (e.g., whether the decision is how to found a republic or what appetizer to share at dinner), the problems of fully considering the input of all group members and fairly resolving any conflicts within the group have daunted the best conciliators and politicians since time immemorial.

When applied to refining a search, group decision-making dynamics often lead to frustration when inputs are misunderstood or conflicts are not satisfactorily resolved. Some group members may feel that their concerns were not properly weighted or were not considered at all. In some cases, a group member may wish that his concerns be considered, but he is shy about letting those concerns be widely known to others in the group.

BRIEF SUMMARY

The above considerations, and others, are addressed by the present invention, which can be understood by referring to the specification, drawings, and claims. According to aspects of the present invention, techniques allow members of a group to collaborate in a search. Each group member can contribute to an original search and to refining the results of the search. Preferences of all of the group members are considered in the search even while those preferences can be kept private. In addition, the search engine can consider aspects of situational awareness (e.g., the time of day and the locations of group members when the search is launched) when performing the search.

In some embodiments of the present invention, at least two group members each submit a search query. The multiple search queries are logically combined (e.g., by a Boolean operation or by a sequential application of the queries) to produce one set of search results. The results can be reviewed by the group members and refined if necessary. In some situations, the search query from one of the group members is run, and the results are presented to a second group member. The second group member can then draft a search query based on the first group member's query and on the results of the first group member's search.

In some embodiments, a search query can be specified by a single group member, but the search engine takes into consideration the stored preferences of multiple group members (in addition to the search query itself, of course). The preferences of each group member can be kept secret from the other group members.

The members of the group may all be operating one device, or they may operate separate devices connected by a data communication session.

If the members of the group so choose, their preferences and search queries can be stored in association with the group. Future searches by the group can then be automatically based on the remembered preferences of the group.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
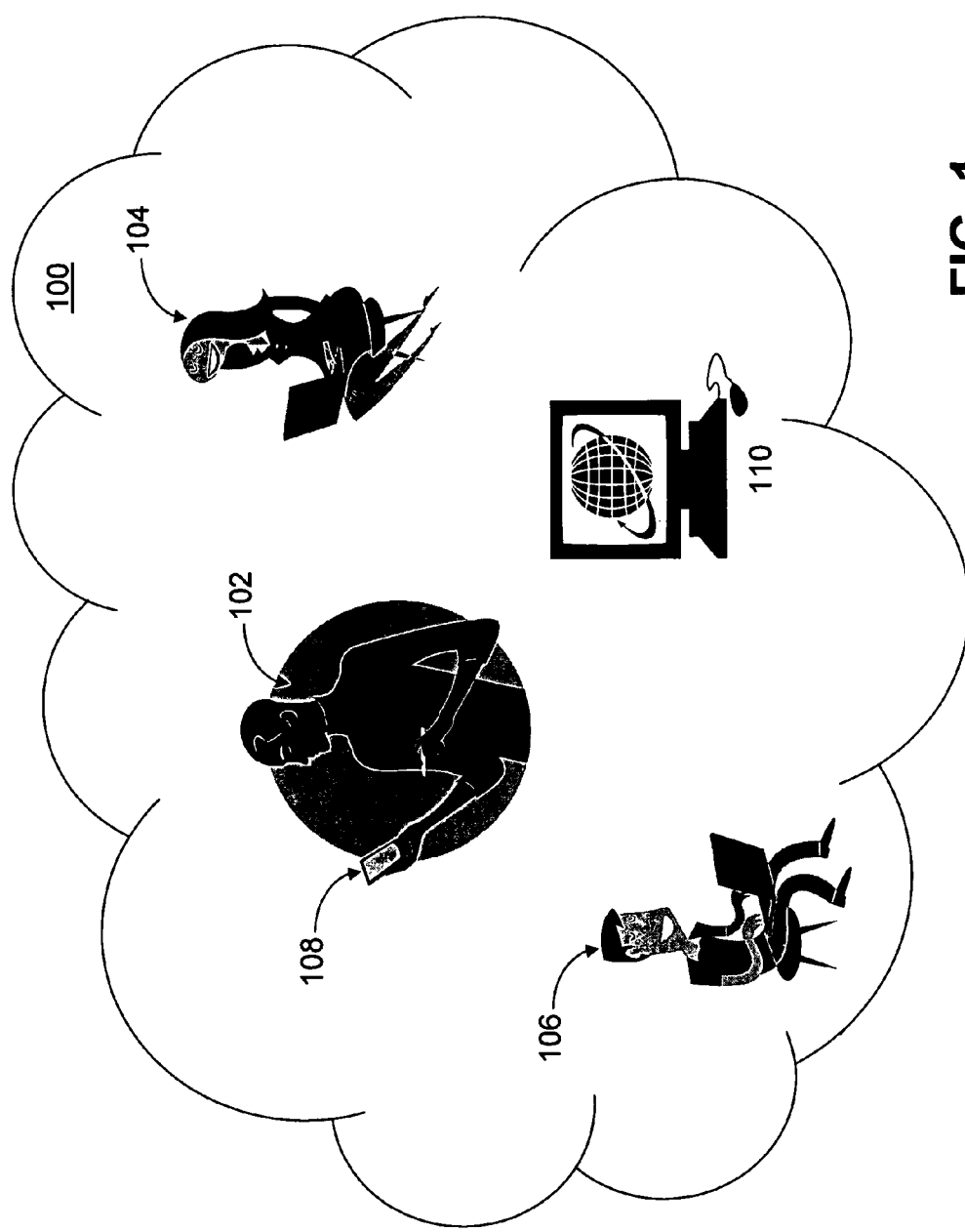
FIG. 1 is an overview of a representational environment in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

In FIG. 1, the members 102, 104, 106 of a group would like to perform a search that takes into account their different preferences and inputs. They may, for example, be searching for a restaurant for dinner, and each group member 102, 104, 106 has unique cuisine preferences, recent dining experiences, and desires for a quick or an elaborate dinner. At least some of the group members 102, 104, 106 are in contact with one another, either by local presence or through a communication network 100. At least one group member 102 has access to a computing device 108. The search may be performed locally on the computing device 108 or may involve a remote search server 110.

Figure 2B:
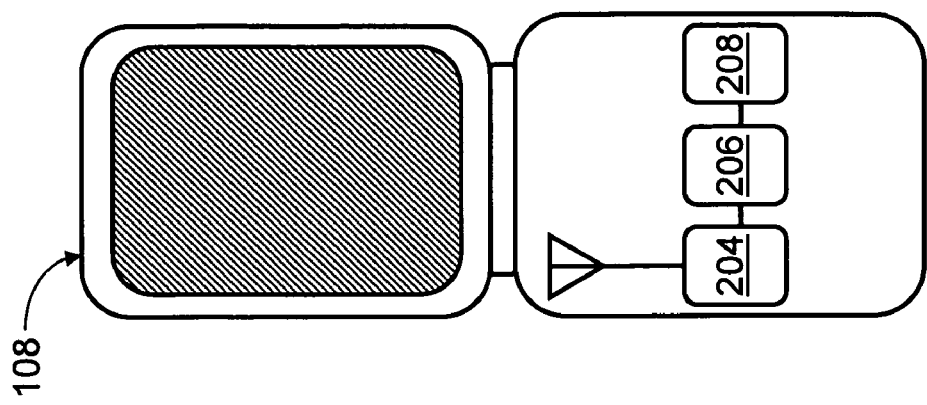
FIGS. 2a and 2b are simplified schematics of a device that supports group-based searching and sharing.
Figure 2A:
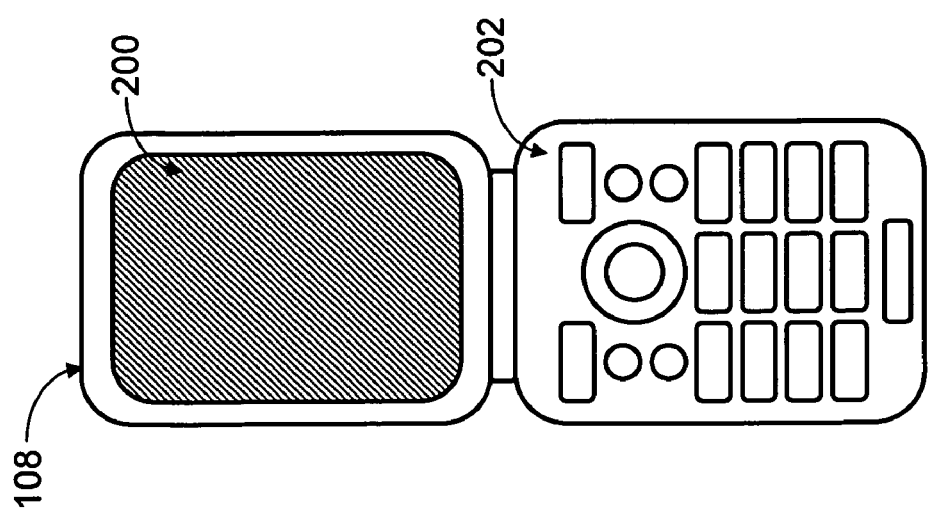

FIGS. 2a and 2b show a representative computing device 108 (e.g., a cellular telephone, personal digital assistant, personal computer, or shared-access computer). In FIGS. 2a and 2b, the computing device 108 is shown as a cellular telephone in an open configuration, presenting its main display screen 200 to a group member. Typically, the main display 200 is used for most high-fidelity interactions with the group member. For example, the main display 200 is used to show video or still images, is part of a user interface for changing configuration settings, and is used for viewing call logs and contact lists. To support these interactions, the main display 200 is of high resolution and is as large as can be comfortably accommodated in the device 108. A device 108 may have a second and possibly a third display screen for presenting status messages. These screens are generally smaller than the main display screen 200. They can be safely ignored for the remainder of the present discussion.

The typical user interface of the computing device 108 includes, in addition to the main display screen 200, a keypad 202 or other user-input devices.

FIG. 2b illustrates some of the more important internal components of the computing device 108. The device 108 includes a communications transceiver 204, a processor 206, and a memory 208.

Figure 3:
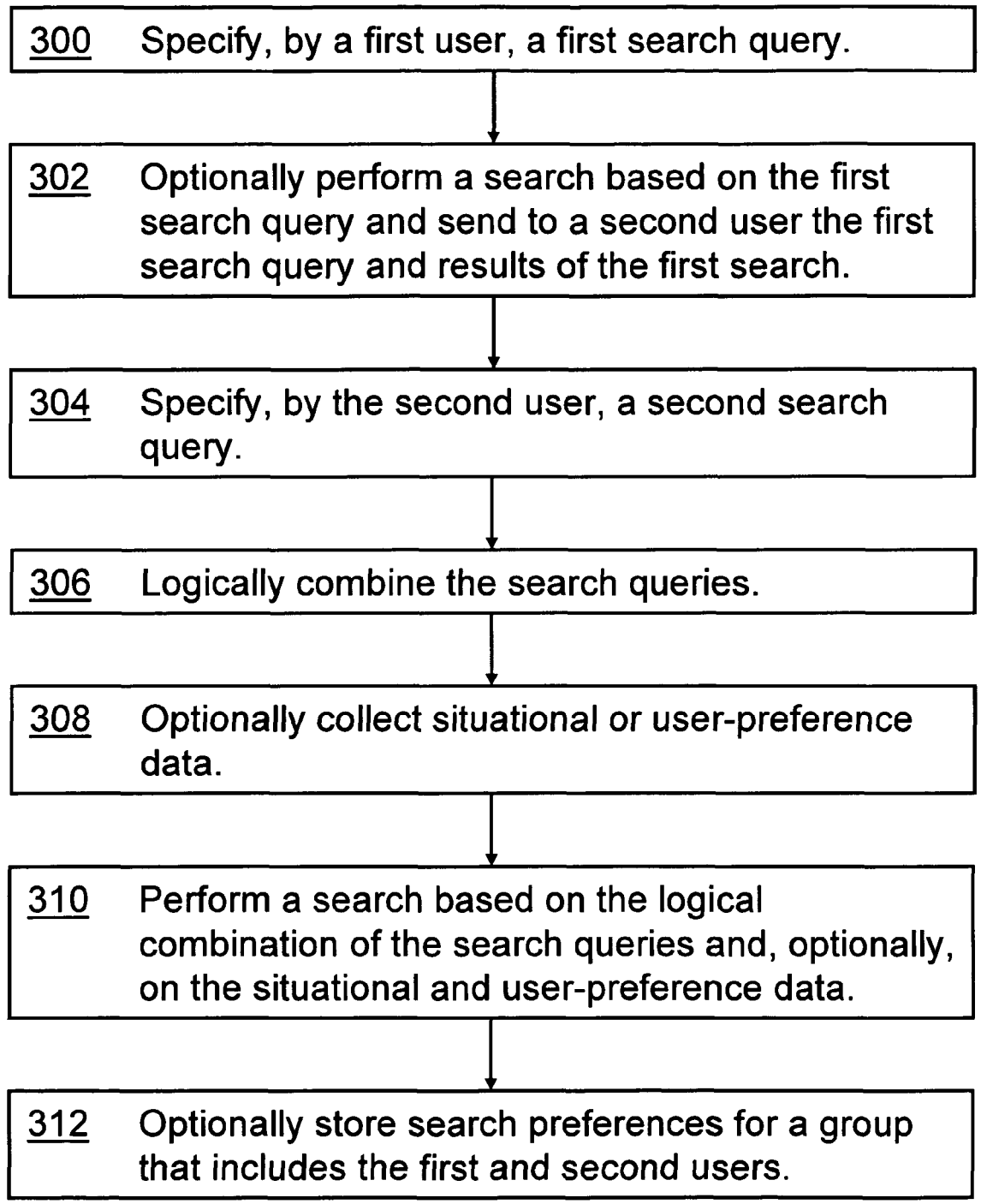
FIG. 3 is a flowchart of an exemplary method that allows at least two group members to provide input to a search.

FIG. 3 presents one method for collaborative searching. In step 300, a first group member 102 enters a first search query into a computing device 108.

In optional step 302, the first search is performed (either locally on the computing device 108 or by contacting the remote search server 110), and results are returned. The first search query and the results of the first search are sent to a second group member 104.

In step 304, the second group member 104 specifies a second search query. In some cases (as when optional step 302 is not performed), the second group member 104 can specify the second query completely independently of the query of the first group member 102. For example, the two group members 102, 104 may simultaneously begin to search for local restaurants.

In other cases, the second group member 104 can review the first search query and the results it produced. Then, the second group member 104 can craft the second search query in a conscious attempt to refine the results of the search of the first group member 102. For example, the second group member 104 can eliminate an element from the first search results, can add an element to those results, can change the priority of elements in the first search results, and can otherwise modify the first search query in anticipation of a second search.

Note that in some situations, the second group member 104 enters the second search query through a computing device separate from the device 108 used by the first group member 102. In another situation, the group members 102, 104, 106 are sitting around a table with a built-in computing device specifically designed for searching. Here, the group members 102, 104 may both enter their search queries into the same device.

Whether or not optional step 302 was performed (that is, whether or not the second group member 104 is consciously responding to the search of the first group member 102), the search queries of the first and second group members 102, 104 are combined in step 306. Several methods are available for combining the two search queries, and the particular method chosen can depend upon the circumstances. In some situations, a Boolean logical operation such as an "AND" can connect the two search queries, thus limiting the final results to what both the first query AND the second query would return. In other situations, the two search queries can be connected by a logical "OR" to expand the results beyond what either search query would have returned by itself. If optional step 302 is performed, then the second search query can simply be applied sequentially to the range of results returned by the first search.

Before a search is performed on the combination of the two (or more) search queries, optional step 308 can be performed to add further information to the search. "Situational awareness" can be used to further specify the search. In a simple example, the time-of-day can be referenced. If the time is early morning, then a restaurant search can be limited to restaurants that are open at that time and that serve breakfast. The current location of the group members 102, 104, 106 can be checked (for example by a GPS receiver in the computing device 108), and the search can be limited to only restaurants near that location. The future location of the group members 102, 104, 106 may be estimated by accessing calendars of the group members 102, 104, 106 to see the times and locations for any meetings or other engagements accepted by any of the group members 102, 104, 106. In a less simple example, the computing device 108 can scan its environment with a built-in microphone or camera. The microphone may, for example, detect that recent conversation has repeatedly used the word "Chinese," so the search can be preferentially pointed to Chinese restaurants. The presence of other group members, beyond the group members 102, 104 who enter search queries, may be detected by sensing their voices or images.

In addition to situational awareness, or in combination with it, step 308 can add known preferences of the group members 102, 104 (and others if detected nearby). For example, group member 102 may be vegetarian, so the search can be directed to retrieve only restaurants with good reputations for their vegetarian dishes. Other preferences can include favorite restaurants, allergies, religious restrictions, transportations restrictions (e.g., limit the search to restaurants near public transportation), a list of restaurants where the group member 102 has recently eaten (and may not wish to visit again too soon), dress code preferences (possibly in relation to what the user 102 is currently wearing), and price level, and the like. If each group member 102, 104, 106 has a personal computing device 108, then the device performing the search may query the other devices for the group members' preferences. These preferences may be confidential, so the methods of the present invention can use the preferences of a group member to specify a search even while keeping those preferences secret from the other group members.

In step 310, the collaborative search is performed. The input to this search can include the first and second (and any other) search queries, the optional situational awareness data, and the optional user-preference data. The results of the search are presented to either one group member 102 or to all group members 102, 104, 106. If necessary, the group members 102, 104, 106 can further refine the search by re-applying the techniques described above or can throw out the results and start again.

Step 312 is another optional step. Here, preferences of the group (as distinct from preferences of the individual group members 102, 104, 106) are stored. The preferences can be extracted from the first and second (and any other) search queries. In some situations, preferences can also be extracted from what the group members do with the final search results. For example, upon seeing the final search results, they may choose a restaurant and make a dinner reservation on-line. That on-line reservation can be noted, and this restaurant added to a list of restaurants preferred by the group. Of course, there are many ways to define the "group" that chose this restaurant, including the group members who participated in the search and any other group members whose presence was detected in the optional step 308. In a future search, this group-preference data can be added to the other inputs of a collaborative search performed in a future step 310.

Situations arise where a decision for a group needs to be made, but where some group members are not available to submit their input. To prevent these group members from being disappointed, aspects of the present invention take into consideration their preferences when performing a collaborative search.

Figure 4:
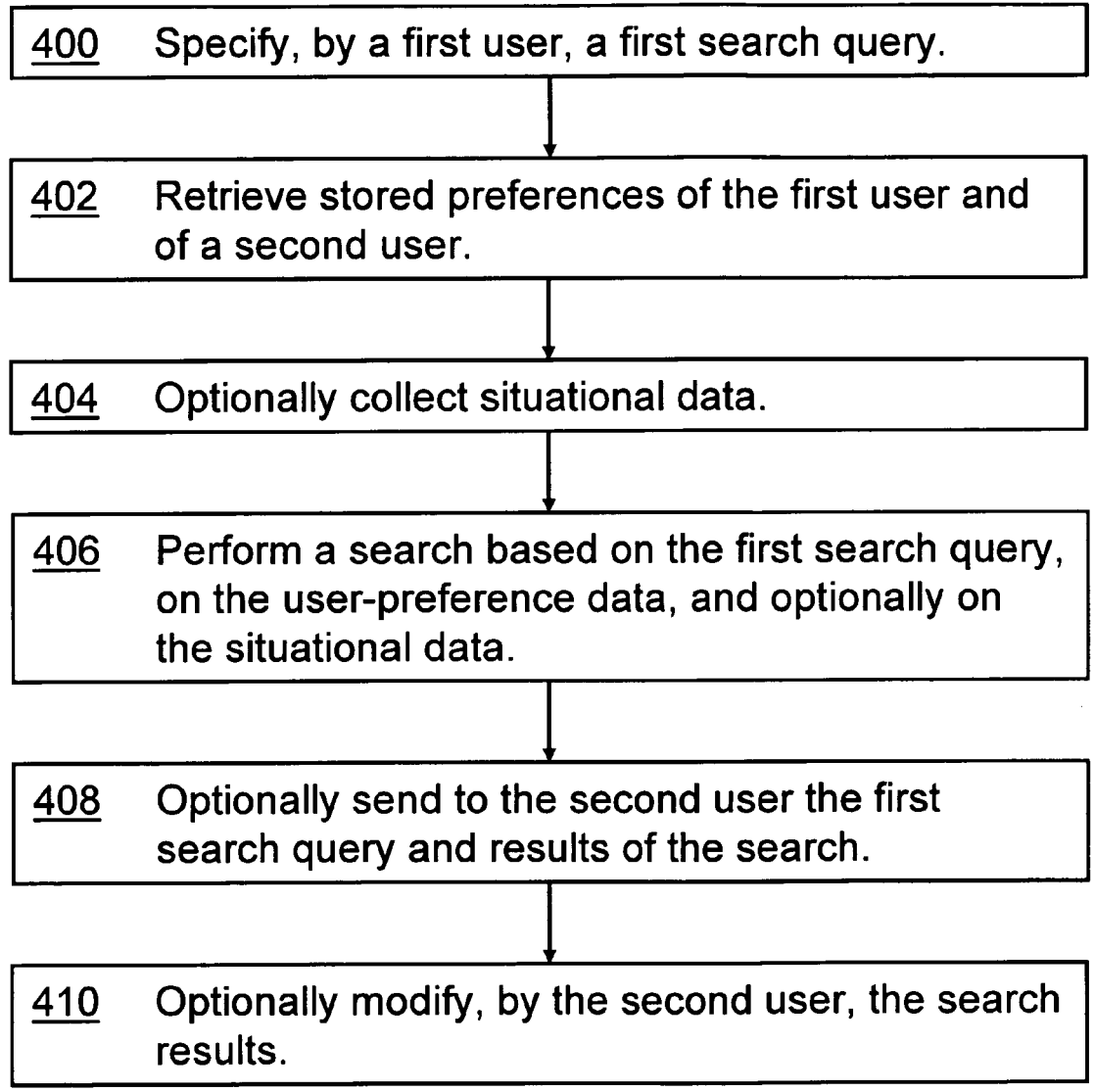
FIG. 4 is a flowchart of an exemplary searching method that considers the preferences of at least two group members.

FIG. 4 presents a method for searching that considers input from all group members, even those not explicitly participating in the search. The method of FIG. 4 can be performed along with the method of FIG. 3, or they can be entirely separate.

The method of FIG. 4 begins when a first group member 102 enters a first search query into a computing device 108.

In step 402, stored preferences of a number of members of the group are retrieved. This is similar to step 308 of FIG. 3, discussed above. Optional step 404 is also similar to step 308 in collecting situational data.

In step 406, the search is performed. The search is based on the first search query, on the retrieved user preferences, and, optionally, on the collected situational awareness data. Thus, this search, though specified by only one group member 102, considers the preferences of other group members.

In a manner similar to steps 302 and 304 of FIG. 3, a second group member 104 can, in steps 408 and 410, refine the search based on the first search query and on the results of the first search.

In view of the many possible embodiments to which the principles of the present invention may be applied, it should be recognized that the embodiments described herein with respect to the drawing figures are meant to be illustrative only and should not be taken as limiting the scope of the invention. For example, a specific user interface can be developed to facilitate collaborative searching. Therefore, the invention as described herein contemplates all such embodiments as may come within the scope of the following claims and equivalents thereof.

We claim:

1. A method for allowing at least two users to collaborate in performing a search, the method comprising:
   on a first communication device, specifying, by a first user, a first search query;
   on a second communication device, specifying, by a second user distinct from the first user, a second search query; and
   on the first communication device, performing a search, the search based, at least in part, on a logical combination of the first and second search queries;
   wherein the search is based on aspects of situational awareness consisting of: a location of the first user when specifying the first search query, a location of the second user when specifying the second search query, a time-of-day when the first search query is specified, a time-of-day when the second search query is specified, image data captured when the first search query is specified, image data captured when the second search query is specified, sound data captured when the first search query is specified, sound data captured when the second search query is specified, a presence of another member of a group that includes the first user and the second user when the first search query is specified, and a presence of another member of a group that includes the first user and the second user when the second search query is specified.

2. The method of claim 1 wherein the logical combination is selected from the group consisting of: a Boolean operation on the first and second search queries and a sequential application of the first and second search queries.

3. The method of claim 1 further comprising:
   on the first communication device, performing a first search, the first search based, at least in part, on the first search query, the first search returning first search results;
   wherein the second search query is based, at least in part, on an element selected from the group consisting of: the first search query and at least a portion of the first search results.

4. The method of claim 3 further comprising:
   on the first communication device, sending, to the second communication device, at least a portion of the first search query and at least a portion of the first search results.

5. The method of claim 1 further comprising:
   on the first communication device, retrieving stored preferences of the first user;
   wherein the search is based, at least in part, on the retrieved preferences of the first user.

6. The method of claim 5 wherein at least a portion of results of the search are presented in an order based, at least in part, on the retrieved preferences of the first user.

7. The method of claim 5 wherein the retrieved preferences of the first user are not disclosed to the second user.

8. The method of claim 5 further comprising:
   on the second communication device, retrieving stored preferences of the second user;
   wherein the search is based, at least in part, on the retrieved preferences of the first and second users.

9. The method of claim 1 further comprising:
   on the first communication device, storing information about a group, the group comprising at least the first user and the second user; and
   on the first communication device, storing preferences for the group, the group preferences based, at least in part, on at least portions of the first and second search queries;
   wherein the search is based, at least in part, on the stored group preferences.

10. A method for allowing preferences of at least two users to affect a search, the method comprising:
    on a first communication device, specifying, by a first user, a first search query;
    on the first communication device, retrieving stored preferences of the first user;
    on a second communication device, retrieving stored preferences of a second user, the second user distinct from the first user; and
    on the first communication device, performing a first search, the first search based, at least in part, on the first search query and on the retrieved preferences of the first and second users, the first search returning first search results;
    wherein the first search is based on aspects of situational awareness consisting of: a location of the first user when specifying the first search query, a time-of-day when the first search query is specified, image data captured when the first search query is specified, sound data captured when the first search query is specified, and a presence of another member of a group that includes the first user and the second user when the first search query is specified.

11. The method of claim 10 wherein at least a portion of the first search results are presented in an order based, at least in part, on the retrieved preferences of the first user and second users.

12. The method of claim 10 wherein the retrieved preferences of the first user are not disclosed to the second user.

13. The method of claim 10 further comprising:
    on the first communication device, sending, to the second communication device, at least a portion of the first search results.

14. The method of claim 13 further comprising:
on the second communication device, sending, by the second user, a proposed modification to the first search results, the proposed modification selected from the group consisting of: eliminating an element from the first search results, adding an element to the first search results, changing a priority of an element of the first search results, and modifying the first search query in anticipation of a second search.

15. A communication device operable by a first user, the device comprising:
a transceiver;
a user interface configured for communicating with a user of the communication device; and
a processor operatively coupled to the transceiver and to the user interface and configured for receiving, via the user interface and from a first user, a first search query, for receiving, from a second user distinct from the first user, a second search query, and for performing a search, the search based, at least in part, on a logical combination of the first and second search queries;
wherein the search is based on aspects of situational awareness consisting of: a location of the first user when specifying the first search query, a location of the second user when specifying the second search query, a time-of-day when the first search query is specified, a time-of-day when the second search query is specified, image data captured when the first search query is specified, image data captured when the second search query is specified, sound data captured when the first search query is specified, sound data captured when the second search query is specified, a presence of another member of a group that includes the first user and the second user when the first search query is specified, and a presence of another member of a group that includes the first user and the second user when the second search query is specified.

16. The communication device of claim 15 wherein the logical combination is selected from the group consisting of: a Boolean operation on the first and second search queries and a sequential application of the first and second search queries.

17. The communication device of claim 15 wherein the processor is further configured for:
performing a first search, the first search based, at least in part, on the first search query, the first search returning first search results;
wherein the second search query is based, at least in part, on an element selected from the group consisting of: the first search query and at least a portion of the first search results.

18. The communication device of claim 15 wherein receiving a second search query comprises:
receiving, via the user interface and from the second user, the second search query.

19. The communication device of claim 15 wherein receiving a second search query comprises:
receiving, via the transceiver and from the second user, the second search query.

20. A communication device operable by a first user, the device comprising:
a transceiver;
a user interface configured for communicating with a user of the communication device; and
a processor operatively coupled to the transceiver and to the user interface and configured for receiving, via the user interface and from a first user, a first search query, for retrieving stored preferences of the first user, for retrieving stored preferences of a second user distinct from the first user, and for performing a first search, the first search based, at least in part, on the first search query and on the retrieved preferences of the first and second users, the first search returning first search results;
wherein the first search is based on aspects of situational awareness consisting of: a location of the first user when specifying the first search query, a time-of-day when the first search query is specified, image data captured when the first search query is specified, sound data captured when the first search query is specified, and a presence of another member of a group that includes the first user and the second user when the first search query is specified.

21. The communication device of claim 20 wherein retrieving stored preferences of a second user comprises:
sending, via the transceiver and to the second user, a request for preferences of the second user; and
receiving, via the transceiver and from the second user, preferences of the second user.

22. The communication device of claim 20 wherein performing the first search comprises:
sending, via the transceiver and to a search engine remote from the communication device, the first search query; and
receiving, via the transceiver and from the search engine, the first search results.

23. The communication device of claim 20 wherein the processor is further configured for sending, via the transceiver and to the second user, at least a portion of the first search results, and for receiving, via the transceiver and from the second user, a proposed modification to the first search results, the proposed modification selected from the group consisting of: eliminating an element from the first search results, adding an element to the first search results, changing a priority of an element of the first search results, and modifying the first search query in anticipation of a second search.

* * * * *